Patented Oct. 8, 1935

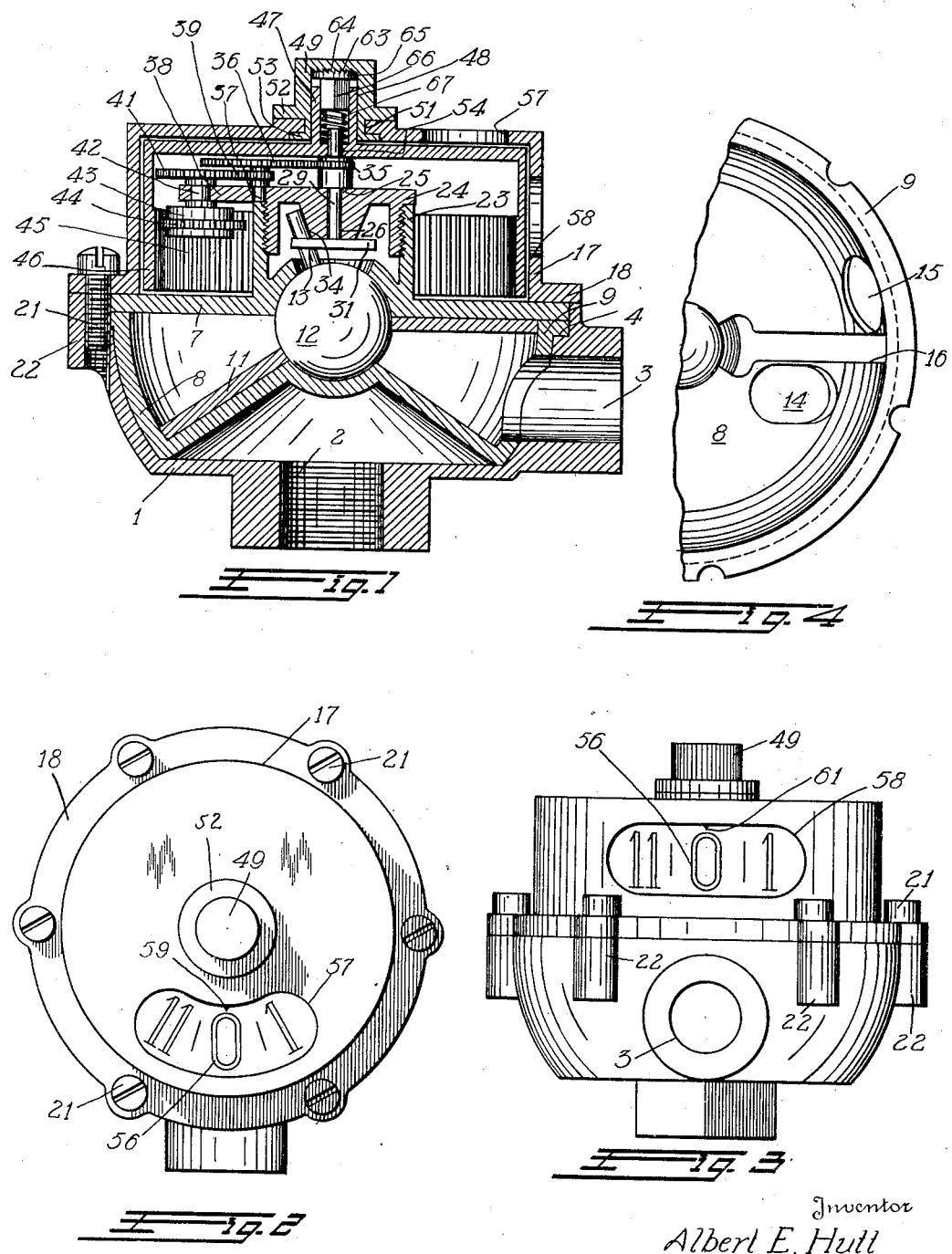

2,016,502

UNITED STATES PATENT OFFICE 2,016,502

METER MECHANISM

Albert E. Hutt, Pelham, N. Y., assignor to Pittsburgh Equitable Meter Company, Pittsburgh, Pa., a corporation of Pennsylvania Application January 16, 1933, Serial No. 652,046

10 Claims. (Cl. 73—98)

The present invention relates to fluid meters of the type designed for handling relatively viscous fluids, such as grease and other lubricants.

More particularly the present invention relates to grease meters especially designed for use in connection with grease dispensing containers of the type that are found today in filling or service stations for dispensing grease to motor vehicles.

Meters of this character are usually carried by a grease container that is portable for the purpose of moving it to get at the various parts of the motor vehicle being serviced. The container is usually provided with a hand operated pump for forcing the grease from the container and the meter is usually mounted on the top of the container and the grease passes from the container through a suitable line through the meter and thence through a suitable dispensing hose to the motor vehicle transmission or differential gear housing that is being supplied with grease. Sometimes a compressed air line is led to the container and operates a suitable pump associated therewith for forcing the grease from the container and the end of the hose in this instance is provided with a shut-off valve so that the operator can immediately shut off the flow of grease as soon as the particular gear casing is filled to the proper level.

Meters of the character mentioned are usually employed in connection with greasing operations wherein the vehicle is driven over a pit in which the operator works. The meters that are in use today are usually very difficult to read, or impossible to read by an operator when he is in the pit, and it is obvious that such reading is desirable. Those that can be read with any degree of facility from the pit are difficult or impossible to read when the operator is on the surface. Moreover various containers require various meter settings, requiring the meter to be disposed in such a position that readings are difficult to obtain.

Meters of the character mentioned are usually so constructed that they are difficult of assembly and disassembly and the parts thereof are sometimes incorrectly assembled with the result that they bind or do not function at all.

Meters of this character are usually provided with means for resetting the indicating member thereof to zero position after each dispensing operation is completed, and those that are in use today are not entirely satisfactory for the reason that they can be tampered with to indicate erroneous fluid consumptions.

Accordingly it is a primary object of the present invention to provide a grease meter of the character mentioned that will meter the fluid with a high degree of accuracy, is compact, consists of a minimum number of parts, may be readily assembled and disassembled, and will not readily get out of order.

A further object of the present invention is to provide a meter of the character mentioned that is so designed that the volume of fluid handled thereby can be readily determined by viewing the dial thereof from a horizontal direction, and which can also be determined with equal facility by viewing the meter from a vertical direction, looking down upon the meter.

A further object of the present invention is to provide a novel friction drive and resetting means for the meter dial that will not readily get out of order.

Other objects of the present invention will appear hereinafter as the specification proceeds in connection with the drawing hereto annexed.

In the drawing:

Figure 1 is a vertical sectional view of my improved grease meter, the section being taken centrally thereof.

Figure 2 is a top plan view of the meter illustrated in Figure 1.

Figure 3 is a side elevation of the meter illustrated in Figure 1 when viewed from the right hand side of that figure.

Figure 4 is a top plan view of a fragment of the lower section of the measuring chamber as it appears when removed from the meter.

Referring to the drawing, wherein like reference characters refer to like parts throughout the several views thereof, numeral 1 represents the lower housing of the meter and which is provided with a threaded inlet opening 2 which is adapted to be screwed on to a vertical pipe of the grease container immediately above the top thereof so that the meter will lie in compact relation therewith.

Housing 1 is provided with an outlet aperture 3 which is adaptd to be connected to any suitable dispensing line. Housing 1 at its upper edge is enlarged by suitable machining operations or the like to provide an annular seat 4.

A fluid measuring chamber having top and bottom cooperating sections 7 and 8 and a radially extending partition forming flange 9, is disposed within the housing 1 with flange 9 thereof resting on annular seat 4. The upper wall 7 of said chamber cooperates with the top portion 17 and the flange 9 to hold the chamber in operative position in the housing and divides the housing into a plurality of compartments. The fluid measuring chamber contains the well known nutating disc type of fluid metering mechanism having a nutating disc 11 carried by a ball 12, journaled in measuring chamber sections 7 and 8, which in turn carries a register driving arm 13. Inlet 14 provided in casing 8 communicates with inlet 2, formed in housing 1, and an outlet 15 formed in casing 8 communicates with outlet 3. Casing 8 is also provided with a slot 16 adapted to cooperate with a division plate (not shown), or the division plate may be integral with the casing, and since this mechanism and its mode of operation are well known, it will not be further described.

An upper housing member 17 has a flanged lower edge defining a seat 18 which is adapted, when the upper housing is in place, to rest upon member 7 which in turn lies upon flange 9 of member 8, and the upper face of seat 4 of housing 1. The two housing sections are held in assembled relation by means of machine screws 21 passing loosely through apertures in flange 18 and are threaded into the lugs 22 formed integral with lower housing 1, which, when drawn up, securely clamps the upper housing member down upon, and securely holds the measuring chamber sections in place within the meter.

The upper face of measuring chamber section 7 is provided with an upstanding internally threaded annular flange 23, and threaded into flange 23 and having a flange abutting the top edge of flange 23 in sealing relation, is a member 24 having bearing portion 25 which is provided with an aperture 26. The bearing portion or shoulder 25 cooperates with the upper surface of the bearing member 24 to form a seal and prevent escape of fluid around the shaft 29. A register driving shaft 29 is journaled in aperture 26 and carries on the lower end thereof the usual driving arm or dog 31 which is secured thereto in well known manner. The lower face of enlarged portion 25 is provided with a smooth conical face 34 which cooperates with driving arm 13 and compels it to move in a circular path during operation thereof. In meters of this type that are used for metering water or gasoline, a roller is usually provided at this point to reduce the friction, but in view of the fact that the meter in the present instance is especially designed for metering grease or other lubricating materials, it is obvious that a quantity of this material will always be present in the region of face 34 and hence no roller is needed as an anti-friction expedient.

The register mechanism will now be described. Shaft 29 extends upwardly above bearing member 24, and has a pinion 35 rigidly secured thereto, which, however, may be integrally formed therewith if so desired. Pinion 35 meshes with and drives gear 36 which is secured to shaft 37 journaled in a laterally extending arm 38 integrally formed with member 24. Secured to shaft 37 is a pinion 39 which meshes with and drives a gear 41 rigidly secured to shaft 42 that is journaled in and extends downwardly below support 38. Shaft 42 carries a friction clutch unit or yielding coupling 43 which has a gear 44 provided on the periphery thereof.

From the structure so far developed it is seen that fluid passing into inlet 2 and into the measuring chamber causes actuation of nutating disk 11, which in turn causes pin 13 to travel in a circular path in contact with conical surface 34. Travel of pin 13 in this manner causes dog 31 to produce rotation of shaft 29. Rotation of shaft 29, through pinions 35 and 39, and gears 36 and 41, causes shaft 42 and yielding coupling 43 carried thereby to be rotated. It is therefore seen that gear 44, carried by yielding coupling 43, is rotated but may have the motion thereof arrested if sufficient resistance is encountered, and therefore gear 44 may be rotated independently of shaft 29 and the intermediate gear train through slippage of coupling 43. Coupling 43 may be constructed in any desired manner, but since couplings of this general character are well known in the art, I have omitted a detailed disclosure thereof for sake of simplifying the disclosure of my invention, and such coupling has been incorporated in the present mechanism for a purpose that will become apparent.

Gear 44 meshes with teeth 45 integrally formed on the inner wall of dial member 46. Dial member 46 is seen to have a disk like dial face and a cylindrical dial face, and is further provided with upstanding integral boss or sleeve member 47, which is journaled in a bore 48 formed in knob 49. Knob 49 is journaled in an aperture 51 formed in the top face of upper housing member 17, and is provided with a flange 52, abutting the top of housing 17, and an upset portion 53 abutting the lower face of housing 17. Dial member 46 is further provided with a central aperture 54 in which the upper end of shaft 29 is rotatably journaled.

It is therefore seen that dial member 46 is rotatably supported, and knob 49 is rotatable with respect thereto.

The circular face and the cylindrical face of dial member 46 are provided with suitable indicia 56 for indicating the quantity of fluid passed through the meter; and the quantity may be expressed in any desired units such as, pints, quarts, or pounds, depending upon the particular installation of, and the material handled by the meter. While I have shown the circular and cylindrical portions of dial 46 as being formed from a single member, and I prefer to form them in this manner, it is to be understood that they may be formed from separate members.

To the end that both dial portions may be read with facility, an opening 57 is formed in the upper face of housing 17, and an opening 58 is formed in the cylindrical wall of housing 17 for viewing the indicia located on the circular and cylindrical dials respectively. Pointers 59 and 61 are formed integral with apertures 57 and 58 respectively for cooperation with the indicia of the respective dials, and these apertures may be covered by windows formed of any suitable transparent material for preventing the introduction of extraneous matter into the register chamber of the meter.

The dial and window assembly that has just been described permits the meter to be correctly read from two different points of vantage located substantially 90° apart, thus allowing readings of the meter to be taken regardless of the installation of the particular meter, and even permits a reading thereof to be taken when the operator, who is dispensing the fluid, is working in a pit under the vehicle.

When the desired quantity of fluid has been dispensed, it is obvious that the indicating dial should be returned to zero position before further fluid has been dispensed. The mechanism that I have provided for accomplishing this result will now be described.

Referring to Figure 2 of the drawing, it is seen that knob 49 should be rotated in a counter-clockwise direction to restore dial member 46 to zero position. To this end, ratchet teeth 63 are formed in the upper end of bore 48 located in knob 49, which cooperate with similar teeth 64 formed on ratchet member 65. Ratchet member 65 is provided with a squared shank 66, which is slidably mounted in a square recess located in the upper end of sleeve member 47, and is urged upwardly into cooperative relationship with teeth 63 by means of a compression spring 67 which bears thereagainst and seats in the bottom of the recess defined by sleeve member 47, and urges the shoulder 25 against the bearing member 24 to assist in maintaining a seal. The spring 67 also introduces a certain amount of frictional resistance to the turning of the dial to prevent accidental displacement thereof. In view of the fact that sleeve member 47 is integral with dial member 46 it is obvious that counter-clockwise rotation of knob 49 will cause teeth 63 thereof to interengage teeth 64 formed on ratchet member 65 and cause similar rotation thereof. Rotation of member 65, by virtue of the squared end 66 thereof seating in a square recess in sleeve member 47, produces rotation of dial member 46, and therefore dial member 46 may be restored to zero position by manual manipulation of knob 49.

When the dial restoring or zero resetting operation of dial 46 is taking place, the gear train, and consequently shaft 29 is stationary because yielding coupling 43 is permitting gear 44 to idly rotate with respect to shaft 42, and in this connection it should be understood that coupling 43 is so designed that the frictional driving connection is such that movement of shaft 42 and gear 44 in unison is effected when shaft 42 is the driving member (the condition that exists when fluid is being metered), and such that will allow gear 44 to be rotated independently of shaft 42 when gear 44 is the driving member, (the condition that exists when knob 49 is actuated to restore dial 46 to zero position).

When fluid metering operations are being carried out, teeth 63 and 64, which are oppositely inclined, slide idly over each other and no rotation of knob 49 is produced by rotation of dial member 46. Likewise, should a dishonest operator attempt to set dial 46 to indicate some fictitious quantity of fluid flow by rotating knob 49, such rotation would merely cause teeth 63 and 64 to idly slide upon each other without producing rotation of dial member 46.

It is therefore seen that I have provided a meter adapted to handle heavy or viscous fluids, that is compact, may be readily assembled and disassembled, which may be read with equal facility from the top or from a position to one side thereof, and is provided with resetting means that is simple and yet will preclude any possibility of improper manual manipulation of the meter dial.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A fluid meter comprising a housing; inlet and outlet connections associated with said housing; a fluid flow actuated device operatively mounted in said housing, a register mechanism driven by said fluid flow actuated device in said housing comprising a supporting structure threaded into said housing and provided with journals; a reduction gear train associated with said supporting structure and having shafts operating in said journals; a dial member yieldingly coupled to said gear train and rotatably mounted on one of said shafts; said dial member having a substantially cylindrical portion enclosing said supporting structure and said gear train and having gear teeth on the inner face of said cylindrical portion cooperating with said gear train, whereby said register mechanism is rendered compact.

2. A fluid meter comprising a housing; inlet and outlet connections associated with said housing; a fluid flow actuated device operatively mounted in said housing; a shaft driven thereby; a register dial rotatably mounted on said shaft and comprising fluid measure indicating means and having a depending cylindrical member mounted in said housing, said cylindrical member having gear teeth formed on its inner wall; means coupling said fluid flow actuated device to said register dial comprising a gear driven from said shaft and meshing with the teeth formed on the inner wall of said cylindrical member.

3. A fluid meter comprising a casing having upper and lower parts; a measuring chamber comprising upper and lower sections clamped between said parts; a fluid flow actuated device within said chamber and having a driving arm projecting therefrom; inlet and outlet passages in the lower part of said casing communicating with said chamber; an upstanding annular threaded boss formed on the upper section of said chamber and enclosing said driving arm; a bearing member threadedly engaging said boss; a shaft journalled in said bearing member and having a driven member cooperating with said driving arm; said shaft having a sealing shoulder thereon engaging said bearing member; and a spring biasing said shoulder against said bearing member to prevent escape of fluid therebetween.

4. A fluid meter comprising a measuring chamber; a fluid flow actuated device within said chamber and having a driving arm projecting therefrom; an upstanding annular threaded boss formed on said chamber and encircling said driving arm; a bearing member threaded into said boss; a shaft journalled in said bearing member and having a driven dog cooperating with said driving arm, said shaft having a shoulder thereon engaging said bearing member, a dial member pivoted on said shaft and a spring member for biasing said shoulder against the bearing member.

5. A fluid meter comprising a measuring chamber; a fluid flow actuated device within said chamber and having a driving arm projecting therefrom; an upstanding annular threaded boss formed on said chamber and enclosing said driving arm; a bearing member threaded into said boss; a shaft journalled in said bearing member and having a driven dog cooperating with said driving arm; said shaft having a shoulder thereon engaging said bearing member; a dial pivoted on said shaft and having a cylindrical skirt, a portion of said skirt forming an internal ring gear; gearing interposed between said shaft and ring gear for yieldingly driving said dial, and a spring biasing said shoulder against said bearing member.

6. A fluid meter comprising a measuring chamber; a fluid flow actuated device within said chamber and having a driving arm projecting therefrom; an upstanding annular threaded boss on said chamber and enclosing said driving arm; a bearing member threadedly engaging said boss; a shaft journalled in said bearing member and having a driven member cooperating with said driving arm, said shaft having a shoulder thereon engaging said bearing member; a dial pivoted on said shaft and having a cylindrical skirt forming an internal ring gear; gearing interposed between said shaft and ring gear for yieldingly driving said dial; a casing enclosing said mechanism and measuring chamber and having a window to permit inspection of said dial; a reset knob having a one way engagement with said dial for resetting the same; and a spring biasing said dial and shaft.

7. A fluid meter comprising a housing and a dividing wall separating said housing into register and measuring chambers, inlet and outlet connections associated with said measuring chamber; a fluid flow actuated device operatively mounted in said measuring chamber, a shaft mounted in the dividing wall and adapted to be driven by said fluid flow actuated device, a dial member rotatably mounted upon said shaft and having a depending cylindrical wall, said cylindrical wall having gear teeth formed on its interior, a gear train enclosed by said cylindrical wall, one gear thereof being mounted on said shaft and another thereof meshing with the gear teeth formed on said wall, a yielding coupling interposed between certain elements of said gear train, and a manually operable means for causing retrograde movement of said dial member against the action of said yielding coupling.

8. The fluid meter set forth in claim 7 wherein means are associated with said manually operable means for rendering the same inoperative to cause forward movement of said dial member.

9. The fluid meter set forth in claim 7 wherein said yielding coupling is enclosed within and cooperates with a gear of said gear train.

10. A fluid meter comprising a housing; a fluid flow actuated device operatively mounted in said housing; a register mechanism driven by said fluid flow actuated device in said housing comprising a shaft journalled in said housing and having a shoulder thereon, a dial member, an upstanding boss having a squared aperture therein integrally formed with said dial member; a ratchet member having a squared shank seated in said boss; an operating knob having teeth formed therein for cooperation with said ratchet member, and a spring urging said ratchet member into engagement with said knob and said shoulder into sealing engagement with a wall of said housing.

ALBERT E. HUTT